(12) United States Patent
Gupta et al.

(10) Patent No.: US 9,864,642 B2
(45) Date of Patent: *Jan. 9, 2018

(54) DETERMINING STORAGE TIERS FOR PLACEMENT OF DATA SETS DURING EXECUTION OF TASKS IN A WORKFLOW

(71) Applicant: INTERNATIONAL BUSINESS MACHINES CORPORATION, Armonk, NY (US)

(72) Inventors: Aayush Gupta, San Jose, CA (US); Sangeetha Seshadri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,470

(22) Filed: Jul. 29, 2016

(65) Prior Publication Data
US 2016/0335134 A1  Nov. 17, 2016

Related U.S. Application Data

(63) Continuation of application No. 14/675,610, filed on Mar. 31, 2015, now Pat. No. 9,430,290.

(51) Int. Cl.
*G06F 9/46* (2006.01)
*G06F 9/52* (2006.01)
(Continued)

(52) U.S. Cl.
CPC .............. *G06F 9/52* (2013.01); *G06F 9/4881* (2013.01); *G06F 9/5016* (2013.01)

(58) Field of Classification Search
None
See application file for complete search history.

(56) References Cited

U.S. PATENT DOCUMENTS 8,793,381 B2   7/2014  Baughman et al.
8,856,291 B2  10/2014  Bartlett et al.
(Continued)

OTHER PUBLICATIONS

A. Chervenak, et al., "Data Placement for Scientific Applications in Distributed Environments", Proceedings of the 8th IEEE/ACM International Conference on Grid Computing, IEEE Computer Society, 2007, pp. 8.
(Continued)

*Primary Examiner* — Sisley Kim
(74) *Attorney, Agent, or Firm* — David W. Victor; Konrad Raynes Davda & Victor LLP

(57) ABSTRACT

Provided are a computer program product, system, and method for determining storage tiers for placement of data sets during execution of tasks in a workflow. A representation of a workflow execution pattern of tasks for a job indicates a dependency of the tasks and data sets operated on by the tasks. A determination is made of an assignment of the data sets for the tasks to a plurality of the storage tiers based on the dependency of the tasks indicated in the workflow execution pattern. A moving is scheduled of a subject data set of the data sets operated on by a subject task of the tasks that is subject to an event to an assigned storage tier indicated in the assignment for the subject task subject. The moving of the data set is scheduled to be performed in response to the event with respect to the subject task.

17 Claims, 9 Drawing Sheets

(51) Int. Cl.
*G06F 9/50* (2006.01)
*G06F 9/48* (2006.01)

(56) References Cited

U.S. PATENT DOCUMENTS

| | | | | |
|---|---|---|---|---|
| 2009/0241117 | A1* | 9/2009 | Dasgupta | G06F 9/5038 718/101 |
| 2011/0227754 | A1* | 9/2011 | Hill | G06F 17/30412 340/870.01 |
| 2013/0290953 | A1 | 10/2013 | Li et al. | |
| 2014/0136779 | A1 | 5/2014 | Guha et al. | |
| 2015/0261462 | A1* | 9/2015 | Miwa | G06F 3/0653 711/114 |
| 2015/0347451 | A1* | 12/2015 | Lee | G06F 17/30194 707/610 |
| 2016/0085587 | A1* | 3/2016 | Dube | G06F 9/5011 718/104 |
| 2016/0283147 | A1* | 9/2016 | Ono | G06F 3/0635 |

OTHER PUBLICATIONS

D. Yuan, et al., "A Data Placement Strategy in Scientific Cloud Workflows", Future Generation Computer Systems 26.8 (2010): 1200-1214.
Wikipedia, "Apache Hadoop", Apache Software Foundation, Dec. 10, 2011, pp. 13, [online][retrieved Mar. 21, 2015], http://en.wikipedia.org/w/index.php?title=Apache_Hadoop&printable=yes.
Y. Chen, et al., "Interactive Analytical Processing in Big Data Systems: a Cross-Industry Study of MapReduce Workloads", Proceedings of the VLDB Endowment, vol. 5, No. 12, Aug. 2012, pp. 1802-1813.
A. Agarwal, et al., "Heterogeneous Storage for HDFS", Aug. 13, 2013, pp. 14, [online] [retrieved online Mar. 3, 2015], https://issues.apache.org/jira/secure/attachment/12597860/20130813-HeterogeneousStorage.pdf.
R. Chansler, et al., "The Hadoop Distributed File System", The Architecture of Open Source Applications, [online] [retrieved online Mar. 3, 2015], http://www.aosabook.org/en/hdfs.html, pp. 11.
T. Harter, et al., "Analysis of HDFS Under HBase: A Facebook Messages Case Study", Proceedings of the 12th USENIX Conference on FIle and Storage Technologies, 2014, pp. 199-212.
A. Wieder, et al., "Orchestrating the Deployment of Computations in the Cloud with Conductor", 9th USENIX Symposium on Networked Systems Design and Implementation, San Jose, CA, 2012, pp. 367-381.
G. Ananthanarayanan, et al., "PACman: Coordinated Memory Caching for Parallel Jobs", 9th USENIX Symposium on Networked Systems Design and Implementation, San Jose, CA, 2012, pp. 267-280.
U.S. Appl. No. 14/675,610, filed Mar. 31, 2015, (18.564).
Office Action dated Jan. 25, 2016, pp. 27, for U.S. Appl. No. 14/675,610, filed Mar. 31, 2015, (18.564).
Response dated Apr. 25, 2016, pp. 12, to Office Action dated Jan. 25, 2016, pp. 27, for U.S. Appl. No. 14/675,610, filed Mar. 31, 2015, (18.564).
Notice of Allowance dated May 20, 2016, pp. 10, for U.S. Appl. No. 14/675,610, filed Mar. 31, 2015, (18.564).
List of IBM Patents or Patent Applications Treated as Related, dated Jul. 29, 2016, pp. 2.

* cited by examiner

Task Vertex Information

Storage Tier Assignment

Data Set Placement Schedule Event

DETERMINING STORAGE TIERS FOR PLACEMENT OF DATA SETS DURING EXECUTION OF TASKS IN A WORKFLOW

BACKGROUND OF THE INVENTION

1. Field of the Invention

The present invention relates to a computer program product, system, and method for determining storage tiers for placement of data sets during execution of tasks in a workflow.

2. Description of the Related Art

Enterprises are moving computational operations including big data analytics to the cloud, where computing can be performed across distributed computing nodes. One system to manage the execution of multiple tasks across various computing nodes is known as Apache™ Hadoop®. (Apache is a trademark and Hadoop is a registered trademark of the Apache Software Foundation throughout the world). Hadoop is an open source software project that enables distributed processing of large data sets across clusters of commodity servers. Hadoop is designed to scale up from a single server to thousands of machines, with a very high degree of fault tolerance. The Hadoop framework is used to run long running analytics jobs on very large datasets through distributed map-reduce style processes.

Some Hadoop distributed computing environments utilize a shared backend storage managed by a storage layer, where each computing node is assigned a portion of the shared storage, which acts as a local storage of the computational node. The storage layer may use a hot/cold data classification to determine where to locate data on different storage tiers, so that the "hot" or more frequently accessed data is placed in the more expensive higher performance storage tier. Other options include assigning higher performance tiers to data sets that have higher Service Level Agreement (SLA) guarantees or based on pricing models.

There is a need in the art for improved techniques for assigning storage tiers to tasks in a distributed computing environment.

SUMMARY

Provided are a computer program product, system, and method for determining storage tiers for placement of data sets during execution of tasks in a workflow. A representation of a workflow execution pattern of tasks for a job indicating a dependency of the tasks and data sets operated on by the tasks is processed. A determination is made of an assignment of the data sets for the tasks to a plurality of the storage tiers based on the dependency of the tasks indicated in the workflow execution pattern, wherein a higher performing storage tier includes faster access storage devices than a relatively lower performing storage tier. A moving is scheduled of a subject data set of the data sets operated on by a subject task of the tasks that is subject to an event to an assigned storage tier indicated in the assignment for the subject task subject. The moving of the data set is scheduled to be performed in response to the event with respect to the subject task.

DETAILED DESCRIPTION

Described embodiments provide techniques for determining a storage tier of a plurality of storage tiers each providing a different level of storage performance to use for tasks executing in different jobs defining a workflow execution pattern. A workflow execution pattern indicating the dependency of the tasks across jobs and dependency across jobs is used to determine the assignment of the data sets operated on by the tasks to the different storage tiers. The storage layer may then schedule the moving of the data sets among the different tiers in response to different task events, such as the starting or completion of tasks. Rules are used to determine the scheduling of the data set placement, such as based on the relatedness of data sets comprising data sets operated on by a same task, operated on by multiple tasks concurrently, operated on by multiple tasks providing input to one dependent task, and other criteria, such as the most optimal placement based on a given utility function (such as maximizing the overall elapsed time across or within workflows). The storage layer then implements the data set placement operation in response to the task event and the determined scheduling of the data set placement for the occurring task event.

Figure 1:
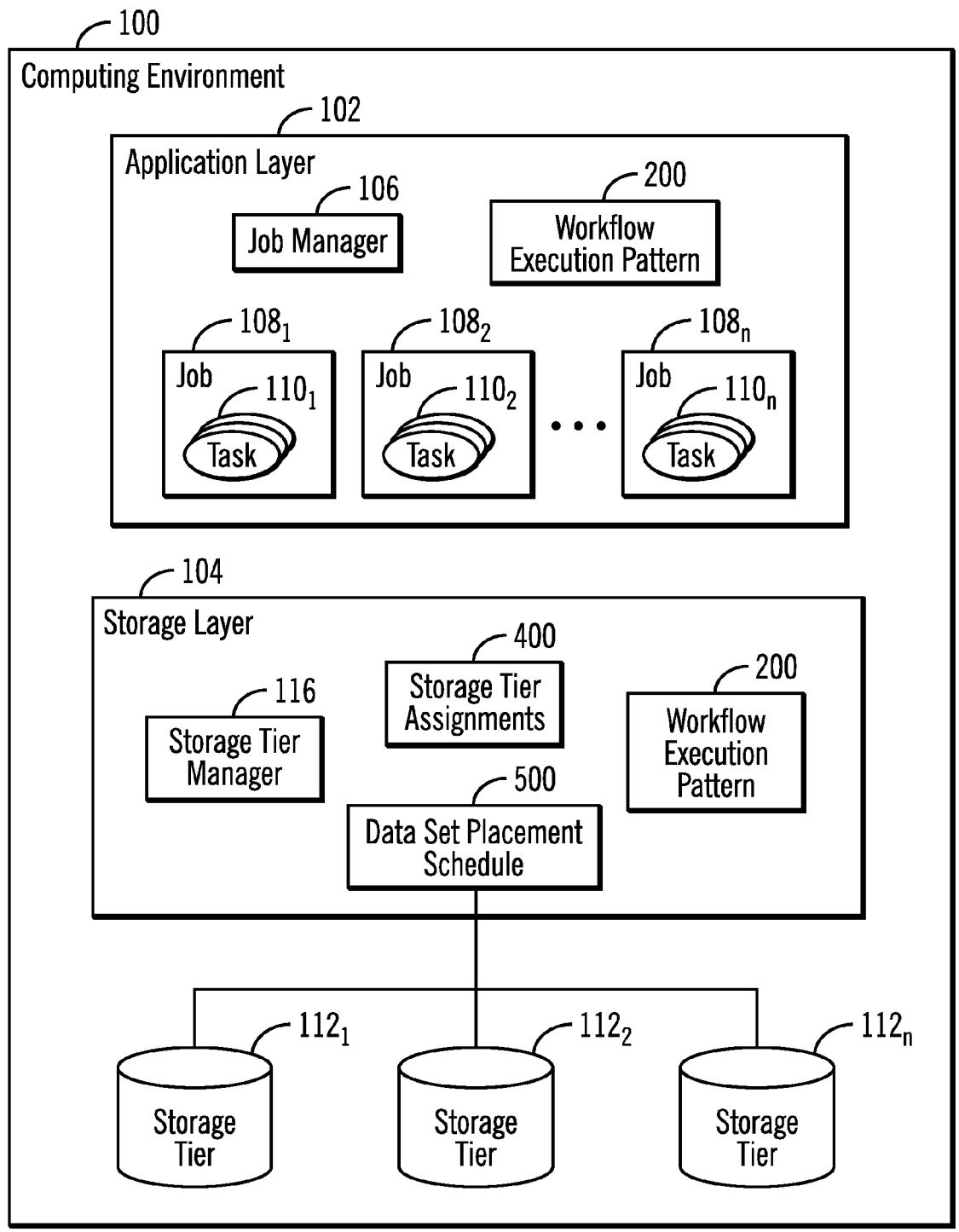
FIG. 1 illustrates an embodiment of a computing environment.

FIG. 1 illustrates an embodiment of a distributed computing environment 100 implemented in one or more computing nodes, virtual nodes and/or physical nodes, that may communicate over a network, such as a cloud computing environment having an application layer 102 and a storage layer 104 to store data sets processed by tasks executing in the application layer 102. Alternatively, the application 102 and storage 104 layers may be implemented in a single computing device or interconnected computing devices. The application layer 102 includes a job manager 106 that manages the flow of execution of one or more jobs $108_1$, $108_2 \ldots 108_n$, each including one or more tasks $110_1$, $110_2 \ldots 110_n$ to execute. Each job $108_1$, $108_2 \ldots 108_n$ is comprised of a collection of one or more tasks $110_1$, $110_2 \ldots 110_n$. A task comprises a unit of work that needs to be performed, and may be comprised of tasks that are sub tasks, where tasks can run concurrently in parallel or sequentially, where one must complete before another task begins. The jobs $108_1$, $108_2 \ldots 108_n$ may be interdependent, where certain of the tasks $110_1$, $110_2 \ldots 110_n$ in multiple jobs may be dependent upon input or completion of a tasks executing in another job. A task may also depend upon execution of a task within the same job. For sequential workflows, a certain subset of the tasks $110_1, 110_2 \ldots 110_n$ must complete before the next dependent task in the same or a different job $108_1, 108_2 \ldots 108_n$ can begin. In this way, tasks may be dependent on the execution of tasks in the same or different jobs. Analytics workloads often include inter-dependencies across jobs because analytic queries are converted to a series of batch processing jobs where the output of one job is used as the input to a next job.

A workflow execution pattern 200 provides a flow pattern describing the flow of execution of tasks, such as may be represented in a Directed Acyclic Graph (DAG). The workflow execution pattern 200 may be structured according to a Hadoop framework and other workflow processing frameworks known in the art. The workflow execution pattern 200 may comprise a large scale data analytics job or other type of job.

The storage layer 104 manages the placement of data sets operated on by the tasks $110_1, 110_2 \ldots 110_n$ on different storage tiers $112_1, 112_2 \ldots 112_n$. In this way, the local storage used by the computational nodes performing the tasks $110_1, 110_2 \ldots 110_n$ in the application layer 102 is assigned a local storage in one of the shared storage tiers $112_1, 112_2 \ldots 112_n$. Each storage class may comprise a different storage management class providing a different level of storage performance, where a higher performance storage tier $112_1, 112_2 \ldots 112_n$ includes higher performing storage devices than a slower performing tier. For instance, a highest performing tier $112_1$ may be comprised of fast access Solid State Storage drives (SSDs), whereas a medium performing tier $112_2$ may be comprised of fast access hard disk drives, and a slowest performing tier $112_n$ may be comprised of the slowest performing hard disk drives.

The storage layer 104 includes a storage tier manager 116 to manage the placement of data sets operated on by the tasks $110_1, 110_2 \ldots 110_n$ onto the storage tiers $112_1, 112_2 \ldots 112_n$ in response to task execution events. The storage tier manager 116 may receive from the application layer 100 the workflow execution pattern 200 and from the workflow execution pattern determine storage tier assignments 400 that provide an assignment of a storage tier $112_1, 112_2 \ldots 112_n$ to each task $110_1, 110_2 \ldots 110_n$ in the jobs $108_1, 108_2 \ldots 108_n$. In certain embodiments, the data sets operated on by a task $110_1, 110_2 \ldots 110_n$ are preferred to be placed on the assigned storage tier $112_1, 112_2 \ldots 112_n$. The storage tier manager 116 may further generate a data set placement schedule 500 that provides a schedule for moving data sets operated on by the tasks among to the storage tiers $112_1, 112_2 \ldots 112_n$ based on different events that occur or states of the tasks, such as starting a task, ending a task, etc.

In one embodiment, the storage tier manager 116 may generate in advance the data set placement schedule 500 to use during execution of the tasks $110_1, 110_2 \ldots 110_n$ by the application layer 102. In an alternative embodiment, the determinations of the data set placement schedule 500 may be made real time while processing task events to implement at the time of receiving the task event.

The storage devices used to implement the storage tiers $112_1, 112_2 \ldots 112_n$ may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices in one storage tier maybe organized as a Redundant Array of Independent Disks (RAID) array, a Just of Bunch of Disks (JBOD) array, and other arrangements. The storage devices in each of the storage tiers $112_1, 112_2 \ldots 112_n$ may be consistent with a storage performance profile associated with the storage tier.

The application layer 102 and storage layer 104 may be implemented on one or more computing nodes, virtual or physical, implemented in computing systems that may communicate over a network, such as a Storage Area Network (SAN), Local Area Network (LAN), Intranet, the Internet, Wide Area Network (WAN), peer-to-peer network, wireless network, arbitrated loop network, etc. In one embodiment, the computing environment 100 may comprise a cloud computing environment where operations are distributed across multiple computing nodes.

Although a certain number of instances of elements, such as jobs, tasks, and storage tiers, etc. are shown, there may be any number of these elements.

Figure 2A:
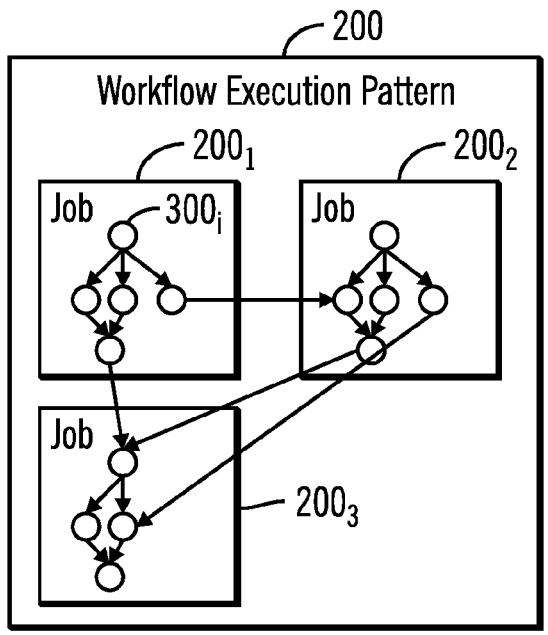
FIG. 2a illustrates an example of a workflow execution plan.

FIG. 2a illustrates an example of a workflow execution environment 200 as including a plurality of jobs $202_1, 202_2,$ and $202_3$ by way of example. The workflow 200 comprises a DAG showing the flow of execution of tasks comprising the vertices, e.g., $300_i$, in the pattern 200. In the example of FIG. 2a, tasks in different jobs are dependent upon the execution and completion of previous tasks in the same and different jobs, and jobs are interdependent on other jobs.

Figure 2B:
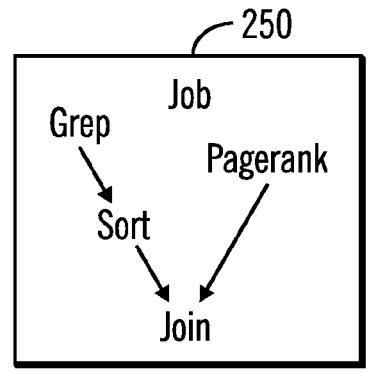
FIG. 2b illustrates an example of a job.

FIG. 2b provides an example of a job 250 to process a query having four tasks, a first Grep task performing a Grep operation, which is a task to perform a search of documents for a matching string, a second Pagerank task to rank the set of documents being searched according to an order, a third Sort task to sort the strings resulting from the Grep task, and a fourth Join task to join the output of the Sort and Pagerank operations based on the user query.

Figure 3:
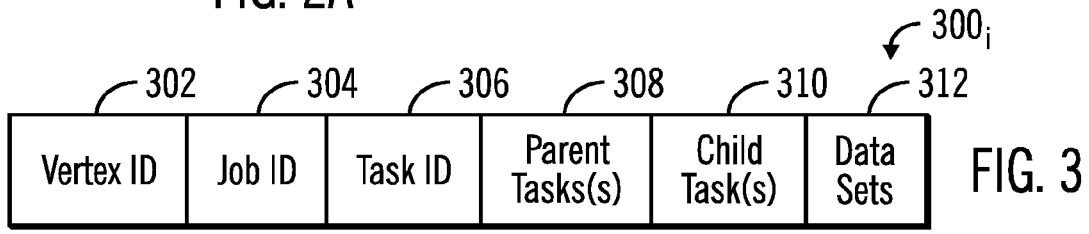
FIG. 3 illustrates an embodiment of task vertex information.

FIG. 3 illustrates an embodiment of task vertex information 300 for one of the tasks represented in the workflow of the workflow execution pattern 200, as including: a vertex identifier (ID) 302 identifying the vertex in the workflow pattern 200; a job ID 304 of the job including a task 306 represented by the vertex 302; parent tasks 308 comprising zero or one or more tasks that must complete before task 306 can begin, such as tasks that provide input to task 306 or that precede task 306 in a sequential workflow; child tasks 312 comprising zero or one or more tasks that cannot begin before task 306 completes, such as tasks that receive input from task 306 or that proceed task 306 in a sequential workflow; and one or more data sets 312 operated on by task 306.

Figure 4:
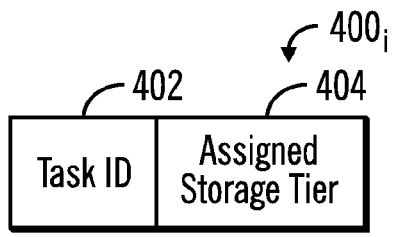
FIG. 4 illustrates an embodiment of a storage tier assignment.

FIG. 4 illustrates an embodiment of an instance of a storage tier assignment $400_i$ as comprising a task ID 402 and an assigned storage tier 404 comprising one of the storage tiers $112_1, 112_2 \ldots 112_n$ that is preferred to be assigned to the data sets to be operated on by the task 402.

Figure 5:
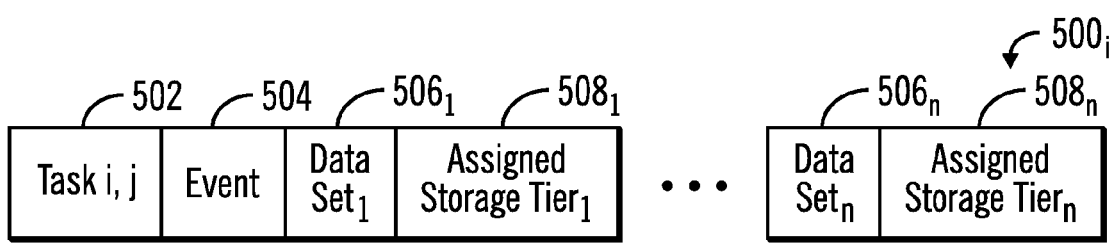
FIG. 5 illustrates an embodiment of a data set placement schedule event.

FIG. 5 illustrates an embodiment of an instance of a data set placement schedule event $500_i$ as including: a task i, j 502, where i is a task in job j; an event 504 that occurs for the task 502, e.g., starting, completing, etc.; and for a plurality of data sets $506_1 \ldots 506_n$ operated on by the task 502 experiencing the task event 504, the assigned storage tiers $508_1 \ldots 508_n$ on which the data sets $504_1 \ldots 504_n$ are preferred to be located in response to the task event 504. The presence of a data set $506_i$ and assigned storage tier $508_i$ pair in the data set placement schedule event $500_i$ may indicate to move the data set $506_i$ to the assigned storage tier $508_i$.

Figure 6:
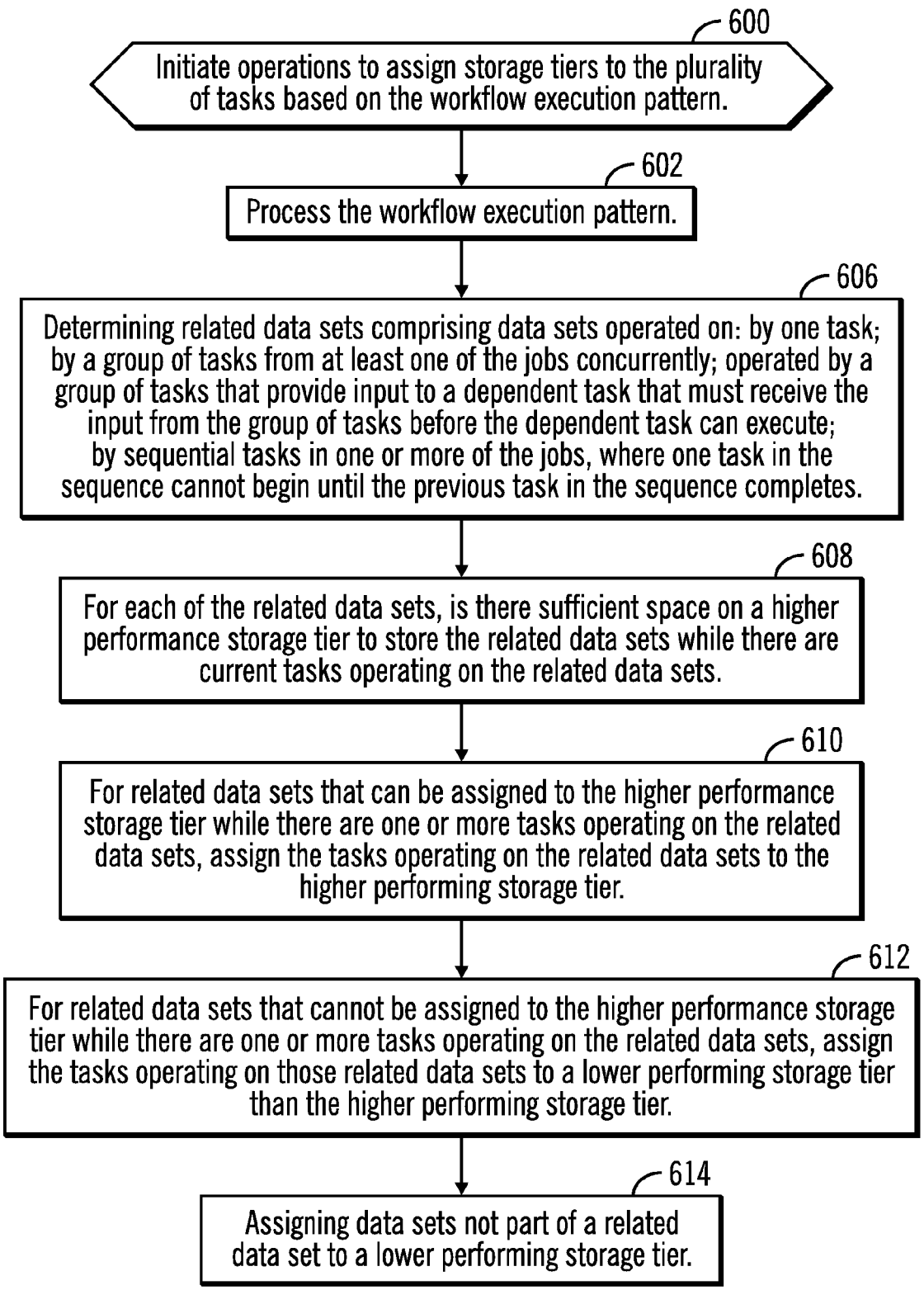
FIG. 6 illustrates an embodiment of operations to assign storage tiers to tasks.

FIG. 6 illustrates an embodiment of operations performed by the storage tier manager 116 to generate the storage tier assignments 400 by applying rules to the task execution flow as represented in the workflow execution pattern 200 and the task vertex information $300_i$. Upon initiating (at block 600) operations to assign storage tiers $112_1$, $112_2$ . . . $112_n$ to the tasks $110_1$, $110_2$ . . . $110_n$, the storage tier manager 116 processes (at block 602) the workflow execution pattern 200 and the task vertex information $300_i$. The storage tier manager 116 determines (at block 606) from the workflow execution pattern 200 related data sets comprising data sets operated on: by one task $110_1$, $110_2$ . . . $110_n$; by a group of tasks $110_1$, $110_2$ . . . $110_n$ concurrently from at least one of the jobs $108_1$, $108_2$ . . . $108_n$; by a group of tasks $110_1$, $110_2$ . . . $110_n$ that provide input to a dependent task that must receive the input from the group of tasks before the dependent task can execute; and by sequential tasks $110_1$, $110_2$ . . . $110_n$ in one or one of the jobs $108_1$, $108_2$ . . . $108_n$, where one task in the sequence cannot begin until the previous task in the sequence completes. Other factors may also be used to determine related data sets. For each of the related data sets, a determination is made (at block 608) whether there is sufficient space on a higher performance storage tier to store the related data sets while there are current tasks operating on the related data sets. For related data sets that can be assigned to the higher performance storage tier $112_1$ while there are one or more tasks operating on the related data sets, the storage tier manager 116 assigns (at block 610) the tasks operating on the related data sets to the higher performing storage tier. For related data sets that cannot be assigned to the higher performance storage tier while there are one or more tasks operating on the related data sets, the storage tier manager 116 assigns (at block 612) the tasks operating on those related data sets to a lower performing storage tier $112_2$ . . . $112_n$ than the higher performing storage tier.

In determining how to assign related data sets to a higher performing storage tier $112_1$, the storage tier manager 116 may select related data sets according to some factor to optimize the placement on the higher performance storage tier $112_1$, such as by size, such as by preferring placing related data sets operated on by a greater number of tasks on the higher performance storage tier $112_1$, operated on by higher priority tasks, etc.

The storage tier manager 116 may assign (at block 614) data sets not part of a related data set to a lower performing storage tier $112_2$ . . . $112_n$. The result of the determined assignments in FIG. 6 is the storage tier assignment 400 providing preferred assignments of storage tiers 404 to tasks 402.

Figure 7A:
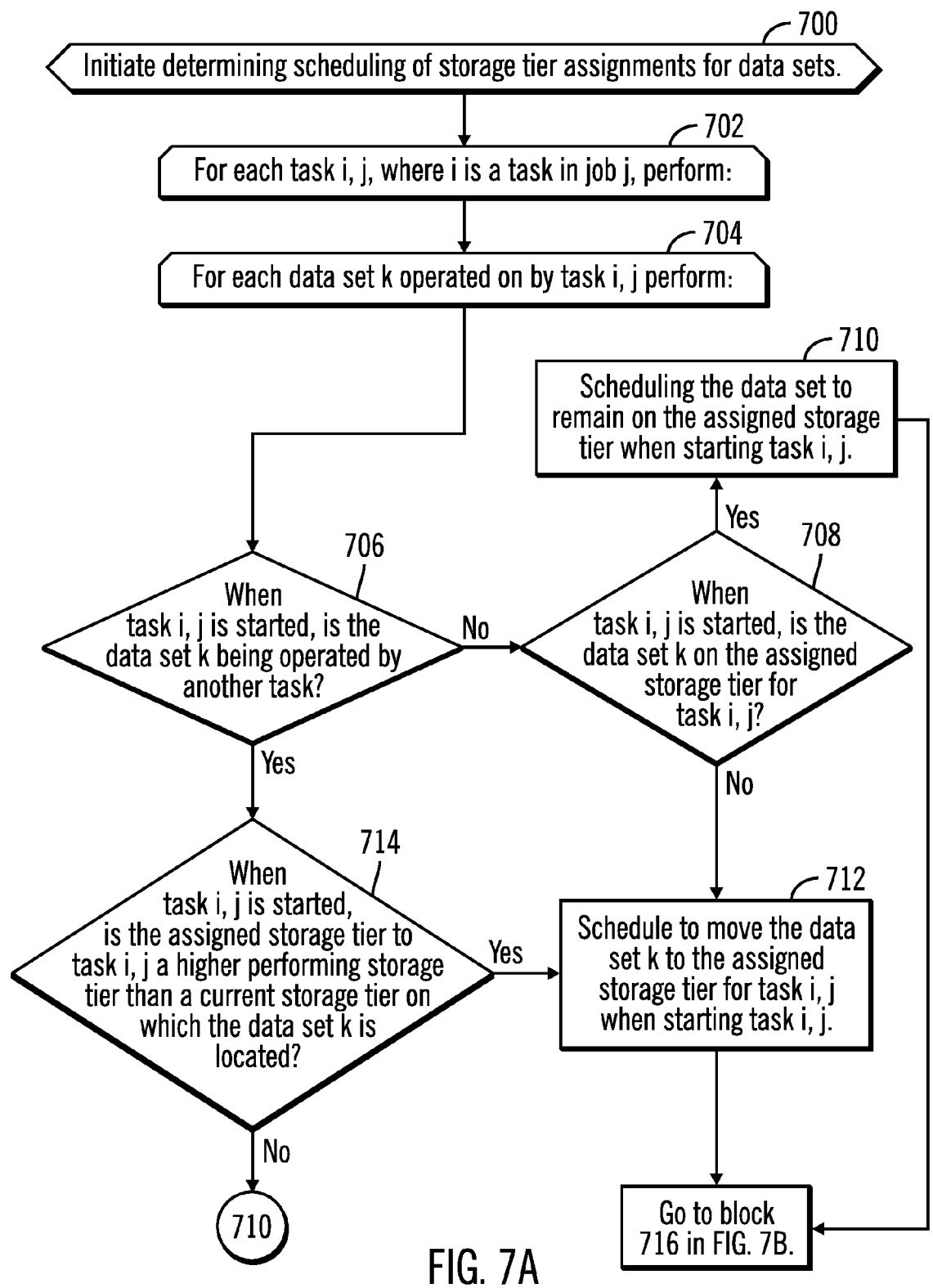
FIGS. 7a and 7b illustrate an embodiment of operations to determine a scheduling of storage tier assignments for data sets.
Figure 7B:
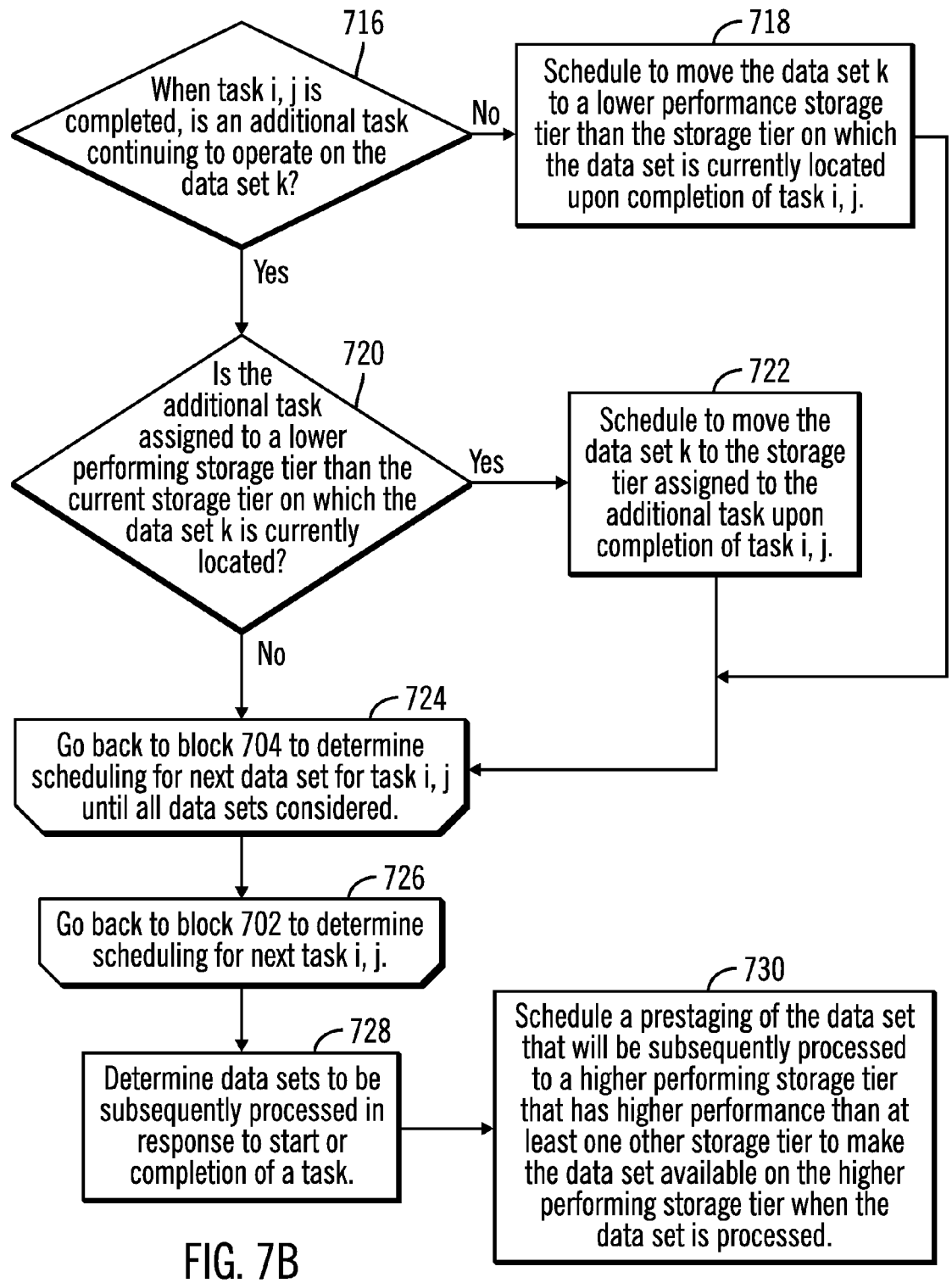

FIGS. 7a and 7b illustrate an embodiment of operations performed by the storage tier manager 116 to determine the data set placement schedule 500 based on the workflow execution pattern 200, vertex information $300_i$, and storage tier assignment 400. With respect to FIG. 7a, upon initiating (at block 702) the operation to determine the scheduling of storage tier assignment for data sets, the storage tier manager 116 begins a loop of operations at block 702 through 726 for a subject task i, j of task i in job j. For each subject task i, j, the storage tier manager 116 performs a loop of operations at blocks 704 through 724 for each subject data set k to be operated on by subject task i, j. If (at block 706) when task i, j is started, the data set k is not being operated by another task, then a determination is made (at block 708) as to whether when task i, j is started the data set k is on the assigned storage tier 404 for the task i, j 402. If (at block 708) when task i, j is started, the data set k is not on the assigned storage tier for task i, j, then the storage tier manager 116 schedules (at block 712) to move the data set k to the assigned storage tier for task i, j when starting task i, j, such as by adding to the data set placement schedule event $500_i$ for the task i, j 502 with a starting event 504 the data set k and the assigned storage tier 404 as a data set $506_i$ and assigned storage tier $508_i$ pair. If (at block 708) the data set k is on the assigned storage tier 404 for task i, j, the data set k is scheduled (at block 710) to remain on the assigned storage tier 404 when starting task i, j. Data set k may be scheduled to remain on the assigned storage tier by not adding a data set $506_i$ and assigned storage tier $508_i$ pair to the data set placement schedule event $500_i$.

If (at block 706) the data set k is being operated on by another task when task i, j is started, then the storage tier manager 116 determines (at block 714) whether when task i, j is started, the assigned storage tier 404 to task i, j is a higher performing storage tier than a current storage tier on which the data set k is located. If so, then the storage tier manager 116 schedules (at block 712) to move the data set k to the assigned storage tier 404 for task i, j when starting task i, j, such as by indicating the task i, j and the assigned storage tier 404 to the data set placement schedule event $500_i$ for the task i, j starting event. Otherwise, if (at block 714) the assigned storage tier 404 for task i, j is not higher performing than the current storage tier, then control proceeds to block 710 to leave the data set located on the current storage tier.

After determining the scheduling operation to perform for data set k when starting task i, j, control proceeds (from block 710 or 712) to block 716 in FIG. 7b to perform scheduling for the completion of the task i, j. If (at block 716) when task i, j is completed an additional task does not continue to operate on the data set k, then the storage tier manager 116 schedules (at block 718) to move the data set k to a lower performance storage tier than the storage tier on which the data set is currently located upon completion of task i, j. The scheduling at block 718 may be performed by adding to the data set placement schedule event $500_i$ for task i, j 502 and a completion event 504, the data set k and lower performing assigned storage tier 404 pair to schedule the move to the lower performing storage tier. If (at block 716) an additional task is operating on the data set k when task i, j is completed, then a determination is made (at block 720) whether the additional task operating on data set k is assigned to a lower performing storage tier than the current storage tier on which data set k is currently located. If so, then the storage manager tier 116 schedules (at block 722) to move the data set k to the storage tier assigned 404 to the additional task upon completion of task i, j. After performing the scheduling for the completed task event (from block 718 or 722) or determining that no scheduling is needed for data set k upon completion of task i, j (from the no branch of block 720), then control proceeds (at block 724) back to block 704 to consider a next data set on which task i, j operates until all one or more data sets are considered. After considering all data sets operated on by the task i, j, control proceeds (at block 726) back to block 702 to consider the next task i, j until all task $110_1$, $110_2$ . . . $110_n$ in all jobs $108_1$, $108_2$ . . . $108_n$ are considered.

The storage tier manager 116 determines (at block 728) data sets to be subsequently processed in response to a start or completion of a task $110_1$, $110_2$ . . . $110_n$. The storage tier manager 116 schedules (at block 730) a prestaging of the data set that will be subsequently processed to a higher performing storage tier that has higher performance than at least one other storage tier to make the data set available on the higher performing storage tier when the data set is processed. To perform the scheduling, the data set to prestage and assigned storage tier pair, such as a higher performing storage tier, may be added to a scheduling event $500_i$ for the task scheduling event that triggers the prestaging.

The described operations of FIGS. 7a and 7b discuss the scheduling of moving of data sets in response to a start and completion event for a task. In additional embodiments, the scheduling of the moving of a subject data set operated on by a subject task may be performed for other types of events occurring with respect to the subject task, in addition to completion and start events for the subject task.

With the described operations of FIGS. 7a and 7b, the data set placement schedule 500 is generated based on the storage tier assignments 400 and status of other task operations with respect to a data set when a task operating on the data set is to start or completes. In an alternative embodiment, the scheduling operations may not be stored in a data set placement schedule 500, but may instead be determined in real time when the application layer 102 processes task events to determine the data set storage tier assignment operation in response to the task event occurring in real-time.

Figure 8:
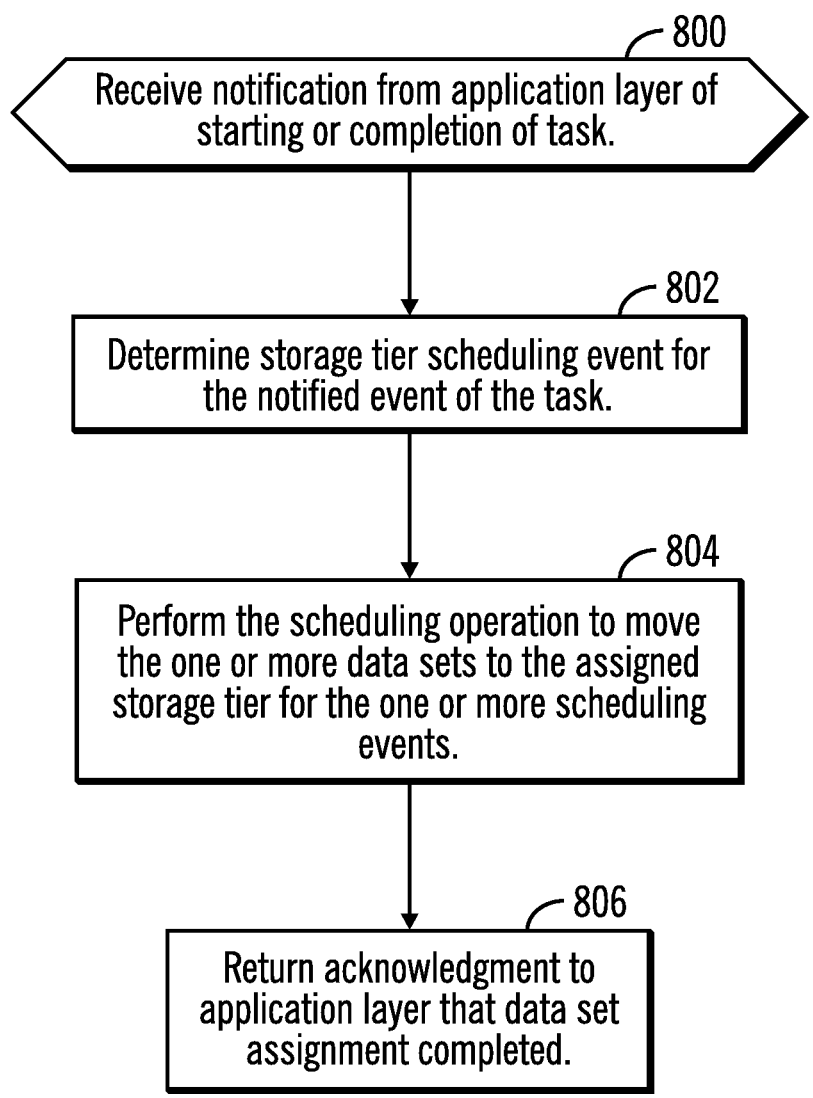
FIG. 8 illustrates an embodiment of operations to move data sets to assigned storage tiers in response to task events.

FIG. 8 illustrates an embodiment of operations performed by the storage tier manager 116 to perform data set placement operations while tasks are executing at the application layer 102. Upon receiving notification (at block 800) from the application layer 102 of the starting or completion of the task, the storage tier manager 116 determines (at block 802) the storage tier scheduling event for the task and the notified event for the task. This determination may be made by processing the data set placement schedule event $500_i$ for the task 502 and event 504 for which the notification was received. The storage tier manager 116 performs (at block 804) the scheduling operation to move the one or more data sets to the assigned storage tier as specified for the scheduling event, e.g., $500_i$, if a movement operation is specified to be performed. Upon performing the data set placement operations to move or leave the data sets operated on by the task experiencing the event on the assigned storage tiers, the storage tier manager 116 returns (at block 806) acknowledgment to the application layer 104 that the data set placement operations completed.

With the described operations of FIG. 8, the application layer 102 coordinates with the storage layer 104 to ensure that data sets are located on the appropriate storage tier $112_2 \ldots 112_n$ upon starting and completing tasks. The application layer 102 may wait until notification is received from the storage layer 104 that the data set assignment operations have completed before proceeding to processing a next task in one of the jobs $108_1, 108_2 \ldots 108_n$ in the workflow execution pattern 200.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
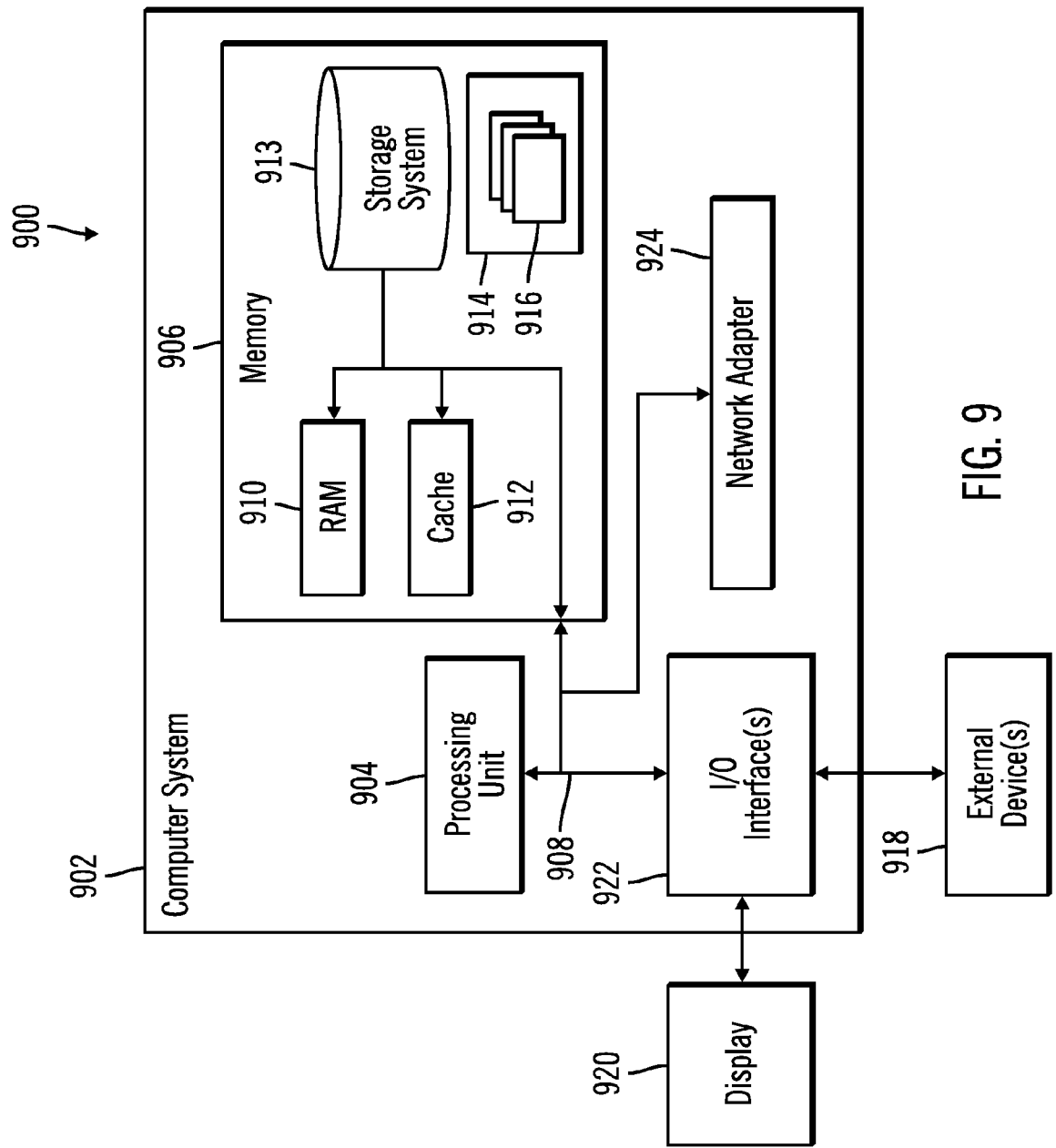
FIG. 9 depicts an embodiment of a cloud computing node.

Referring now to FIG. 9, a schematic of an example of a cloud computing node is shown, such as the nodes that execute the jobs and tasks in the application layer 102 and nodes that perform the storage layer 104 management operations of storage tier manager 116. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 20. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Figure 10:
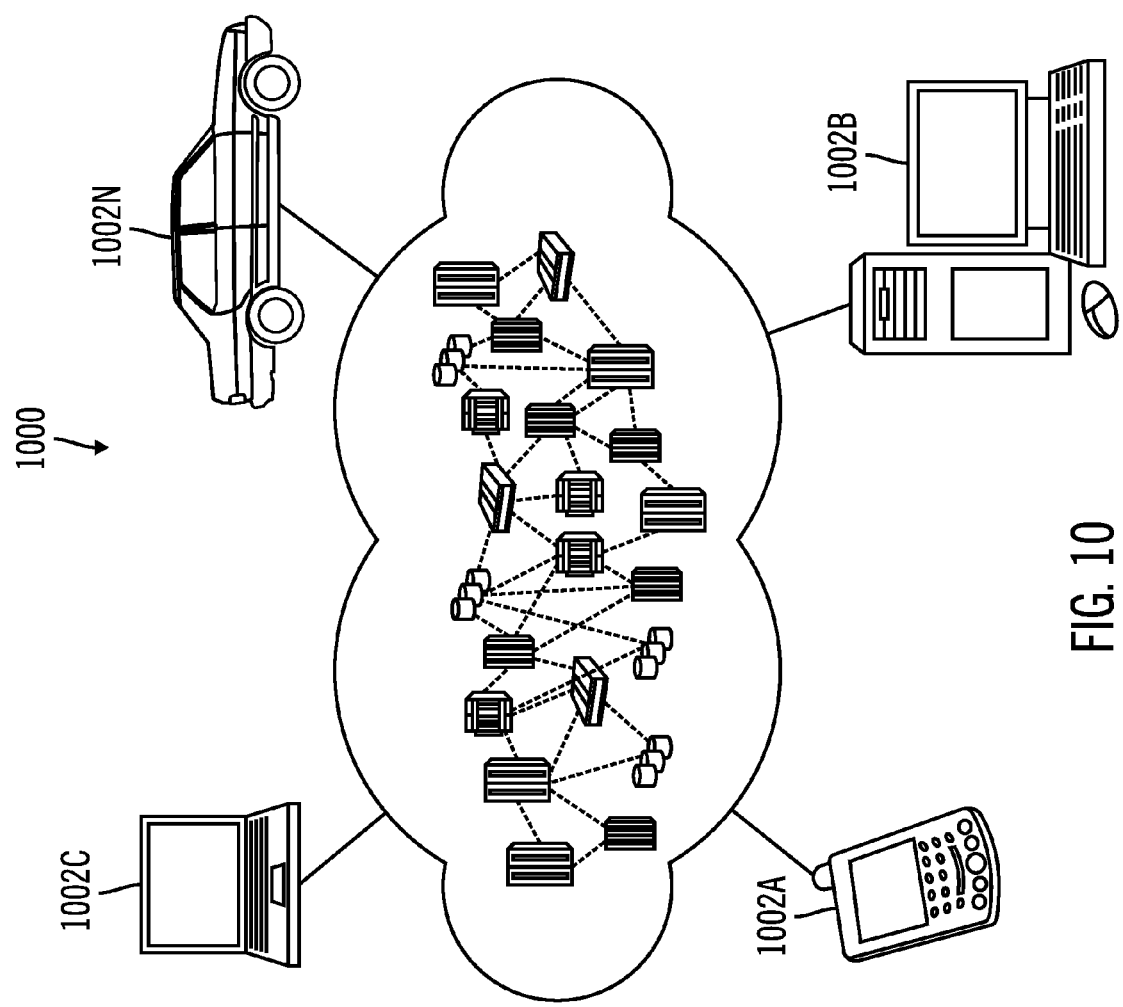
FIG. 10 depicts an embodiment of a cloud computing environment.

Referring now to FIG. 10, illustrative cloud computing environment 1000 is depicted. As shown, cloud computing environment 1000 comprises one or more cloud computing nodes 1000 with which local computing devices used by cloud consumers, such as, for example, personal digital assistant (PDA) or cellular telephone 1002A, desktop computer 1002B, laptop computer 1002C, and/or automobile computer system 1002N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1002A-N shown in FIG. 10 are intended to be illustrative only and that computing nodes 1000 and cloud computing environment 1000 can communicate with any type of computerized device over any type of network and/or network addressable connection (e.g., using a web browser).

Figure 11:
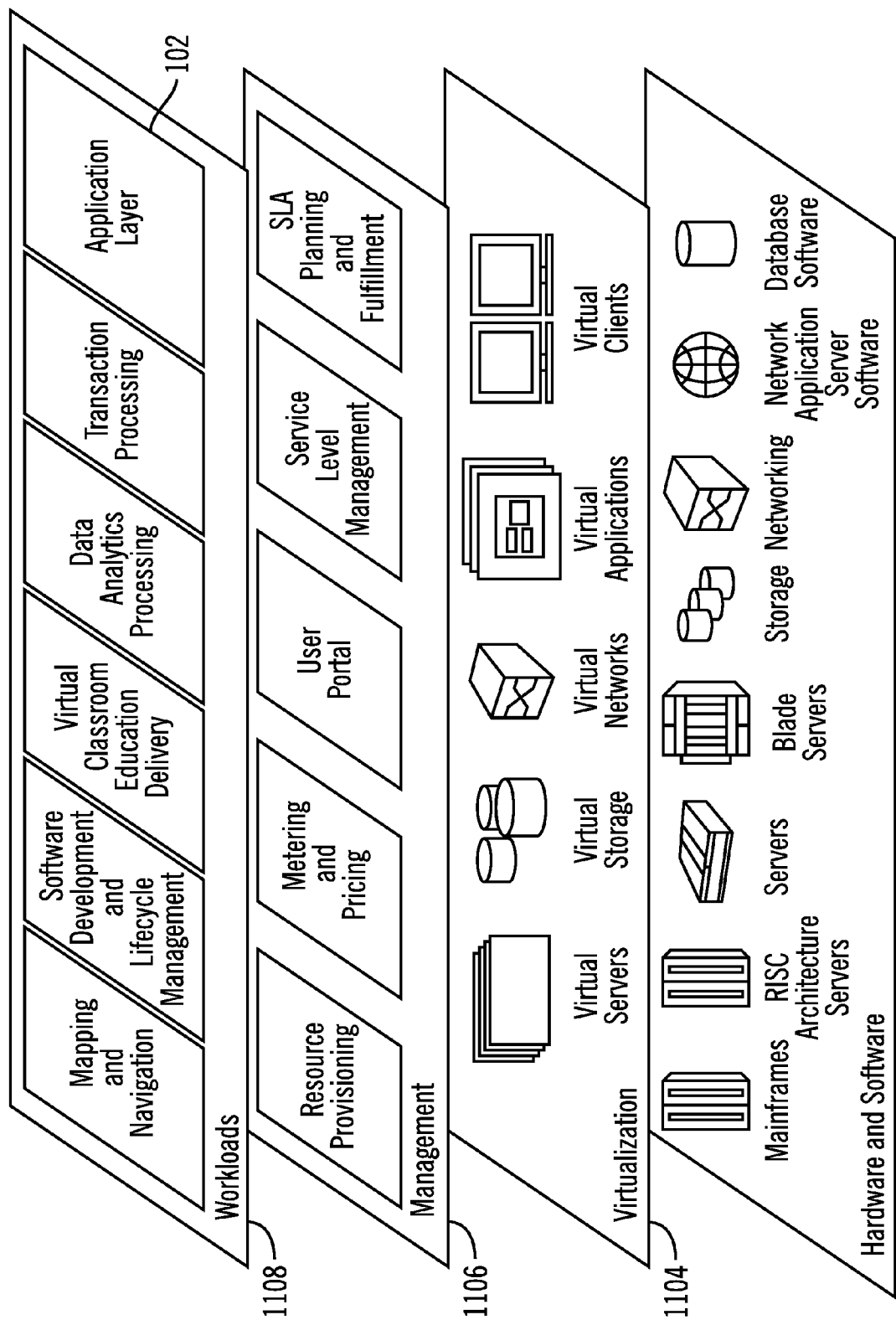
FIG. 11 depicts an embodiment of abstraction model layers of a cloud computing environment.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The storage layer 104 may be implemented in the functions of the management layer 1106.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the application layer 102 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, j, k, n are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for assigning tasks to storage tiers to store data sets processed by the tasks, wherein the computer program product comprises a computer readable storage medium having program instructions embodied therewith, the program instructions executable by a processor to cause operations, the operations comprising:
processing a representation of a workflow execution pattern describing a flow of execution of tasks for at least one job indicating a dependency of the tasks and data sets operated on by the tasks, wherein a dependent task in a job depends upon execution of at least one or more tasks in at least one of the job including the dependent task and at least one other job not including the dependent task;

determining an assignment of the data sets operated on by the tasks to a plurality of the storage tiers based on the dependency of the tasks indicated in the workflow execution pattern, wherein a higher performing storage tier includes faster access storage devices than a relatively lower performing storage tier; and scheduling to move a subject data set of the data sets operated on by a subject task of the tasks to a storage tier of the storage tiers assigned to the subject task.

2. The computer program product of claim 1, wherein the operations further comprise:

determining whether the subject data set is already located on the storage tier assigned to the subject data set in the assignment, wherein the subject data set is scheduled to be moved to the storage tier assigned to the subject data set in the assignment in response to determining that the subject data set is not already located on the storage tier assigned to the subject data set in the assignment.

3. The computer program product of claim 1, wherein an application layer executing the workflow execution pattern of tasks transmits the workflow execution pattern of tasks for the at least one job to a storage layer managing access to the storage tiers, wherein the storage layer performs the determining the assignment and the scheduling to move the subject data set, wherein the operations further comprise:

notifying, by the storage layer, the application layer that a data set for a next task is located on a storage tier of the storage tiers assigned to the subject data set in the assignment; and executing, by the application layer, the next task in response to receiving the notification from the storage layer that the data set operated on by the next tasks is located on the storage tier assigned to the subject data set in the assignment.

4. The computer program product of claim 1, wherein the subject task comprises a completed task, wherein the operations further comprise:

determining whether an additional task is currently operating on the subject data set operated on by the completed task; and scheduling to move the subject data set operated on by the completed task to a lower performing storage tier than assigned to the completed task in response to determining that there is no additional task currently operating on the subject data set operated on by the completed task.

5. The computer program product of claim 1, wherein the determining the assignment comprises:

determining related data sets comprising multiple data sets operated on by a single task, wherein related data sets are located on a same storage tier.

6. The computer program product of claim 1, wherein the determining the assignment comprises:

assigning a same storage tier to multiple tasks that concurrently operate on a same data set.

7. The computer program product of claim 1, wherein the determining the assignment comprises:

assigning a same storage tier to multiple input tasks operating on at least one data set that provide input to a dependent task that cannot execute until receiving the input from the input tasks.

8. The computer program product of claim 7, wherein the same storage tier assigned to the multiple input tasks is assigned to a preferred higher performing storage tier having higher performance than at least one other storage tier.

9. The computer program product of claim 1, wherein the workflow execution pattern comprises a plurality of jobs, wherein each of the jobs includes a plurality of tasks that operate on data sets, wherein the determining the assignment comprises:

determining related data sets comprising at least one of: multiple data sets operated on by a single task in one of the jobs; multiple data sets concurrently operated on by a first group of tasks from at least one of the jobs; multiple data sets that must be operated on by a second group of tasks from at least one of the jobs before at least one dependent task from at least one of the jobs can execute; and multiple data sets operated by sequential tasks in at least one of the jobs part of a sequential workflow; and assigning tasks operating on related data sets to a preferred higher performing storage tier having higher performance than at least one other storage tier.

10. The computer program product of claim 9, wherein the operations further comprise:

determining whether there is sufficient space on the preferred higher performing storage tier for the related data sets; and assigning the tasks operating on the related data sets to a lower performing storage tier than the preferred higher performing storage tier that has sufficient space to store the related data sets in response to determining that the preferred higher performing storage tier does not have the sufficient space to store the related data sets.

11. The computer program product of claim 1, wherein the operations further comprise:

determining that a data set will be subsequently processed by one of the tasks in the workflow execution pattern; and scheduling a prestaging of the data set that will be subsequently processed to a higher performing storage tier that has higher performance than at least one other storage tier to make the data set available on the higher performing storage tier when the data set is processed.

12. A system coupled to a plurality of storage tiers, comprising:

a plurality of computational nodes; and a computer readable storage medium having program instructions that when executed by the computational nodes perform operations, the operations comprising:

processing a representation of a workflow execution pattern describing a flow of execution of tasks for at least one job indicating a dependency of the tasks and data sets operated on by the tasks, wherein a dependent task in a job depends upon execution of at least one or more tasks in at least one of the job including the dependent task and at least one other job not including the dependent task;

determining an assignment of the data sets operated on by the tasks to a plurality of the storage tiers based on the dependency of the tasks indicated in the workflow execution pattern, wherein a higher performing storage tier includes faster access storage devices than a relatively lower performing storage tier; and scheduling to move a subject data set of the data sets operated on by a subject task of the tasks to a storage tier of the storage tiers assigned to the subject task subject.

13. The system of claim 12, wherein the operations further comprise:

determining whether an additional task is currently operating on a data set operated on by a completed task; and scheduling to move the data set operated on by the completed task to a lower performing storage tier than assigned to the completed task in response to determining that there is no additional task currently operating on the data set operated on by the completed task.

14. The system of claim 12, wherein the workflow execution pattern comprises a plurality of jobs, wherein each of the jobs includes a plurality of tasks that operate on data sets, wherein the determining the assignment comprises:

determining related data sets comprising at least one of: multiple data sets operated on by a single task in one of the jobs; multiple data sets concurrently operated on by a first group of tasks from at least one of the jobs; multiple data sets that must be operated on by a second group of tasks from at least one of the jobs before at least one dependent task from at least one of the jobs can execute; and multiple data sets operated by sequential tasks in at least one of the jobs part of a sequential workflow; and assigning tasks operating on related data sets to a preferred higher performing storage tier having higher performance than at least one other storage tier.

15. A method for assigning tasks to storage tiers to store data sets processed by the tasks, comprising:

processing a representation of a workflow execution pattern describing a flow of execution of tasks for at least one job indicating a dependency of the tasks and data sets operated on by the tasks, wherein a dependent task in a job depends upon execution of at least one or more tasks in at least one of the job including the dependent task and at least one other job not including the dependent task;

determining an assignment of the data sets operated on by the tasks to a plurality of the storage tiers based on the dependency of the tasks indicated in the workflow execution pattern, wherein a higher performing storage tier includes faster access storage devices than a relatively lower performing storage tier; and scheduling to move a subject data set of the data sets operated on by a subject task of the tasks to a storage tier of the storage tier assigned to the subject task.

16. The method of claim 15, wherein the subject task comprises a completed task, further comprising:

determining whether an additional task is currently operating on a data set operated on by the completed task; and scheduling to move the data set operated on by the completed task to a lower performing storage tier than assigned to the completed task in response to determining that there is no additional task currently operating on the data set operated on by the completed task.

17. The method of claim 15, wherein the workflow execution pattern comprises a plurality of jobs, wherein each of the jobs includes a plurality of tasks that operate on data sets, wherein the determining the assignment comprises:

determining related data sets comprising at least one of: multiple data sets operated on by a single task in one of the jobs; multiple data sets concurrently operated on by a first group of tasks from at least one of the jobs; multiple data sets that must be operated on by a second group of tasks from at least one of the jobs before at least one dependent task from at least one of the jobs can execute; and multiple data sets operated by sequential tasks in at least one of the jobs part of a sequential workflow; and assigning tasks operating on related data sets to a preferred higher performing storage tier having higher performance than at least one other storage tier.

* * * * *